United States Patent Office 2,851,432
Patented Sept. 9, 1958

2,851,432
RESINOUS PRODUCTS AND PROCESS OF PREPARING THE SAME

John C. Petropoulos, Norwalk, Conn., assignor to American Cyanamid Company, New York, N. Y., a corporation of Maine No Drawing. Application July 19, 1957
Serial No. 673,096

19 Claims. (Cl. 260—22)

This invention relates to a novel class of oil modified alkyd resins and to the process of preparing the same. More particularly, this invention relates to a novel class of alkyd resins prepared by reacting an oily material selected from the group consisting of glyceride oils, the fatty acids derived therefrom and their monoglycerides, a polyhydric alcohol and an acid having the general formula:

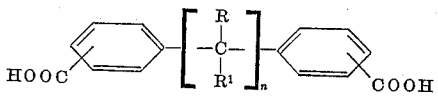

wherein R and $R^1$ are alkyl groups containing 1 to 4 carbon atoms and $n$ is a whole number between 1 and 2, inclusive.

One of the objects of the present invention is to produce a new and useful class of alkyd resins prepared by reacting an oily material such as glyceride oil with a polyhydric alcohol and certain alkylidene-bis-benzoic acids. A further object of the present invention is to produce a novel class of oil modified alkyd resins which will find utility principally in the coating resin art. These and other objects of the present invention will be discussed in greater detail hereinbelow.

In the preparation of alkyd resins, it is generally conventional to make use of a dicarboxylic acid which is free from non-benzenoid unsaturation. The outstanding acid used commercially in the preparation of alkyd resins is phthalic acid or phthalic anhydride. Alkyd resins prepared from phthalic anhydride are usually modified with a fatty acid and have, for the most part, fairly satisfactory properties but in some respects these alkyd resins have certain well established shortcomings.

For example, the chemical resistance and impact resistance of fatty acid modified phthalic alkyd resins is closely related to the amount of fatty acid modifier. An increase in fatty acid content almost always improves the impact resistance of phthalic alkyds at the expense of chemical and heat resistance. Conversely a decrease in fatty acid modifier improves heat and chemical resistance but adversely effects impact resistance. These deficiencies have limited the use of phthalic alkyd resins in many fields, some of the important ones being can coatings and primers for appliances such as washing machines, refrigerators, ranges and the like.

The alkyds of the present invention when compared with phthalic alkyds at comparable hardness are far superior in chemical resistance, toughness as measured by knife scratch, and impact resistance. In addition, at the same degree of ultimate hardness, the alkyds of the present invention cure (air dry or bake) at a considerably faster rate than phthalic alkyds.

In the preparation of the dicarboxylic acids used in the present invention, certain ditolyl alkanes are oxidized to the corresponding dibenzoic acids. It is imperative, however, that the tolyl groups in the novel carboxylic acids of the present invention be joined together through one or more non-terminal carbon atoms of the alkane.

If these linking carbon atoms in the alkane chain are terminal carbon atoms, the markedly superior results realized in the practice of the process of the present invention are not experienced. First of all, the ditolyl alkanes in which the tolyl groups are joined through a terminal carbon atom of the alkane are not readily oxidizable to the corresponding dicarboxylic acid and, in fact, there is often cleavage between the two tolyl groups in which oxidation takes place at the alkane group joining the tolyl groups rather than on the methyl groups on the aryl nuclei. Even though such a ditolyl alkane were to be oxidized successfully to the corresponding dicarboxylic acid the alkyd resin produced therefrom would show a lack of heat stability, light stability, lack of good color, color stability, gloss and strength. Still further such an alkyd resin would not be stable to mild oxidizing conditions such as air at elevated temperatures in the presence of metallic salt driers. The exact opposite is true of the alkyd resins prepared from the dicarboxylic acids used in the present invention. These new alkyd resins show improved heat stability, improved light stability, improved color, improved color stability, improved gloss, improved strength, and said alkyd resins are stable to mild oxidizing conditions such as those mentioned above.

These ditolyl alkanes may be oxidized under any of the usual oxidizing conditions to form the corresponding dicarboxylic acids. In the oxidation of the ditolyl alkanes, one may utilize temperatures varying from about room temperature to about the boiling point of the ditolyl alkane. It is preferred, however, to utilize temperatures greater than about 100° C. as the temperatures significantly below that temperature will cause the oxidation reaction to proceed slowly. The oxidation reaction may be carried out in the presence of any of the well known oxidizing reagents such as chromic acid in glacial acetic acid; potassium permanganate, in the presence of an alkali; potassium dichromate, in the presence of a strong acid such as sulfuric acid, or the oxidation may simply be carried out by flowing air, oxygen or a gas containing oxygen through the charge. The oxidation could further be carried out in the presence of heavy metal catalysts such as the metallic salts of organic acids such as the cobalt, lead, iron, nickel, manganese, magnesium and the like salts of acetic acid, propionic acid, oleic acid, stearic acid, rosin acids, naphthenic acid and the like. The oxidation can be carried either at atmospheric pressure or super-atmospheric pressures such as about 3 or 4 atmospheres. The oxidation may be carried out either in the liquid phase or in the vapor phase. In the vapor phase, the ditolyl alkane would be vaporized and in being boiled off would be passed over a fixed bed of catalysts of the vanadium type. In the vapor phase, there is a possibility of closer control of the contact time, temperature, and the separation of the oxidized material from the unoxidized in a recycling operation. In such an oxidation reaction, it is generally desirable to stop the conversion at about 30–40% of the calculated yield in order to avoid side reactions and other complications. The oxidation reaction being stopped at just such a point would permit the separation of the dicarboxylic acids thus produced and the recyclization of the ditolyl alkanes. The lower limit on the reaction temperature of the oxidation reaction is generally considered to be above the melting point of the particular ditolyl alkane selected for oxidation. Still lower temperatures can be utilized if the oxidation is carried out with the ditolyl alkane dispersed or dissolved in a solvent medium. The utilization of the solvent medium, however, may well effect the upper limit at which the oxidation can be carried out, inasmuch as the boiling point of the solvent will be one of the controlling factors in the oxidation temperature. Of course, if super-atmospheric pressure is utilized, the boiling point of the solvent is not a necessary limitation on the temperature of the oxidation reaction. The solvent medium should properly be a material which cannot readily be oxidized under the oxidation conditions of the reaction. Otherwise, complications of mixed end products will be presented. In addition to the oxidation in a solvent medium, dispersions and emulsions may be utilized as the medium for oxidation.

Some of the ditolyl alkanes which are oxidized to the dibenzoic acids used in the present invention may be prepared by reacting a compound having the general formula:

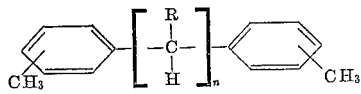

wherein R is hydrogen or an alkyl group containing between 1 and 4 carbon atoms, and wherein $n$ is a whole number between 1 and 2, inclusive, with an olefin having between 2 and 4 carbon atoms such as ethylene, propylene and butylene either alpha, beta or isobutylene. Instead of using an olefin containing between 2 and 4 carbon atoms, one could react the compound with an alkyl halide having between 1 and 4 carbon atoms, such as methyl iodide or the like to yield a methyl substituent in place of the hydrogen on the alkane. The total number of mols of methyl iodide or olefin used in the reaction will depend on the total number of available hydrogens on the alkane that are to be replaced.

The following is set forth for the purpose of illustrating the method of the preparation of a ditolyl alkane. This example is set forth primarily for the purpose of illustration and all parts are parts by weight.

PREPARATION OF 2,2-DI(P-TOLYL)BUTANE

Into an autoclave there is introduced 105 parts of 1,1-di(p-tolyl)ethane, 5 parts of sodium and 1.5 parts of o-toluic acid. The system is purged with nitrogen gas and then sealed. The autoclave is then heated to about 170° C. and the pressure is released. There is then charged 11.8 parts of ethylene at 100 p. s. i. and the system is closed. The temperature is then maintained at 170° C. with intermittent addition of ethylene until no further pressure drop is experienced. This requires about 6 hours. The autoclave is then cooled and the reaction products are filtered and washed with hexane. The filtrates are combined, washed and distilled. The product produced is 2,2-di(p-tolyl)butane having a boiling point of 196° C. at 20 millimeters of pressure.

PREPARATION OF 3,3-DI(P-TOLYL)PENTANE

The preceding example is repeated in all essential details except that in the place of 1,1-di(p-tolyl)ethane, there is substituted an equivalent amount of 1,1-di(p-tolyl)propane and in the place of the o-toluic acid, there is substituted an equivalent amount of o-chlorotoluene. The resultant product is a viscous liquid having a boiling point of 213–220° C. at 15 mm. of mercury. The product is 3,3-di(p-tolyl)pentane.

Among the ditolyl alkanes which may be prepared by a comparable process or by the alkyl halide process and which may be used in the practice of the process of the present invention are 2,2-di(p-tolyl)propane; 2,2-di(o-tolyl)propane; 2,2-di(m-tolyl)propane; 1,2-di(p-tolyl)-1,1,2,2-tetramethylethane; 1,2-di(p-tolyl) - 1,1,2,2-tetraethylethane; 1,2-di(p-tolyl)-1,1,2,2-tetrapropylethane; 1,2-di(p-tolyl)-1,1,2,2-tetrabutylethane; 1,2 - diethyl - 1,2-di-methyl - 1,2 - di(p-tolyl)ethane; 1,1,2,2 - tetraethyl-1,2-di(o-tolyl)ethane; 1,1,2,2 - tetrabutyl - 1,2 - di(o-tolyl)-ethane; 2,2 - di(p-tolyl)butane; 2,2 - di(o-tolyl)butane; 2,2 - di(m-tolyl)butane; 2,2 - di(p-tolyl)pentane; 2,2-di(o-tolyl)pentane; 2,2 - di(m-tolyl)pentane; 3,3 - di(p-tolyl)pentane; 3,3 - di(o-tolyl)pentane; 3,3-di(m-tolyl)-pentane; 2,2 - di(p-tolyl)hexane; 3,3 - di(o-tolyl)hexane; 3,3 - di(p-tolyl)heptane; 3,3 - di(o-tolyl)heptane; 4,4-di-(p-tolyl)heptane; 4,4 - di(p-tolyl)octane; 5,5-di(p-tolyl)-nonane; 5,5 - di(o-tolyl)nonane; 5,5-di(m-tolyl)nonane, and the like.

PREPARATION OF 4,4'-(2,2-BUTYLIDENE)-DIBENZOIC ACID

Into a suitable reaction vessel equipped with thermometer, stirrer and reflux condenser, there is introduced 10 parts of 2,2-di(p-tolyl)butane, 300 parts of acetic acid, 300 parts of water, 90 parts of concentrated sulfuric acid and 70 parts of chromic acid. The mixture is heated to reflux temperature and maintained at that temperature for about 10 hours. On diluting the reaction mixture with water, 7 parts of a solid material precipitated. After purification by recrystallization from alcohol, this solid material melted at 267° C. uncorrected, and had a neutral equivalent of 150 (theoretical=149). The product is identified as 4,4'-(2,2-butylidene)dibenzoic acid.

ALTERNATIVE PREPARATION OF 4,4'-(2,2-BUTYLIDENE)DIBENZOIC ACID

Into an autoclave equipped as in the first example, there is introduced 23.8 parts of 2,2-di-p-tolyl butane, 30.6 parts of concentrated nitric acid, and 61.0 parts of water. The reactants are heated to 160° C., whereupon the reaction becomes exothermic and the temperature increases to about 190° C. The reactants are held at 170–190° C. for 30 minutes. Thereafter, the charge is cooled to room temperature and the reactants are discharged. The product produced, a light tan solid, is obtained in an 84% yield and melts at about 220–225° C. After several recrystallizations from acetic acid to remove the color impurities, the melting point is raised to 267–8° C. uncorrected. The analysis: Calculated for $C_{18}H_{18}O_4$: C, 72.47; H, 6.08; neutral equivalent 149. Found: C, 72.23; H, 6.14; neutral equivalent 150.

PREPARATION OF 4,4'-(3,3-PENTYLIDENE)-DIBENZOIC ACID

Into an autoclave equipped as in the first example, there is introduced 25.2 parts of 2,3-di-(p-tolyl)-pentane, 30.6 parts of concentrated nitric acid and 61 parts of water. The reactants are heated to 160° C., whereupon the reaction becomes exothermic and the temperature rises to about 185–190° C. The reactants are held at 175–190° C. for about 30 minutes, whereupon the charge is cooled to room temperature and the reactants discharged. The yield is approximately 87% of theoretical and the product produced is a light tan solid which melts at about 255–285° C. After several recrystallizations from acetic acid, the melting point is determined at 305–6° C., uncorrected. The product produced is 4,4'-(3,3-pentylidene)dibenzoic acid. Analysis calculated for $C_{19}H_{20}O_4$: C, 73.06; H, 6.45; neutral equivalent 156. Found: C, 73.11; H, 6.65, neutral equivalent 153.

PREPARATION OF DIMETHYL-4,4'-(3,3-PENTYLIDENE)DIBENZOATE

To 1.0 part of 4,4'-(3,3-pentylidene)dibenzoic acid, dissolved in 50 parts of methanol, there is added 8 parts of anhydrous hydrogen chloride. The clear solution was concentrated by evaporation to 20 parts by weight. On cooling, 0.95 part (87% yield) of a colorless solid crystallized in clusters of needles. The solid had a melting point of 85° C., uncorrected. The product was dimethyl-4,4'-(3,3-pentylidene)dibenzoate.

PREPARATION OF 4,4'-(1,1,2,2-TETRAMETHYL-ETHYLENE)DIBENZOIC ACID

Into a suitable reaction vessel equipped as in the first example, there is introduced 20 parts of 1,1,2,2-tetramethyl-1,2-di(p-tolyl)ethane, 600 parts of acetic acid, 600 parts of water, 140 parts of chromic acid and 180 parts of sulfuric acid. The charged mixture is heated at the reflux temperature for about 22 hours. Dilution of the system with water caused 20 parts of a solid material to precipitate which had a neutral equivalent of 113. The crude solid which precipitated was treated with alkali yielding two fractions; the first fraction (A) was soluble in cold alkali, whereas the second fraction (B) was soluble in hot alkali. The latter fraction (B), on acidification, gave a solid acid which, after purification by crystallization from acetic acid, melted at 218–19° C. uncorrected. The analysis and infrared spectrum on this material are compatible with the monobasic acid having the following formula: 1,1,2,2-tetramethyl-1-(p-tolyl)-2-(p-carboxyphenyl)ethane. Analysis calculated for $C_{20}H_{24}O_{2}$: C, 81.04; H, 8.16; —COOH, 15.19. Found: C, 81.30; H, 8.23; —COOH, 14.88. The acidification of fraction (A) gave a white solid of a melting point of greater than 300° C. This material was found to be insoluble in most of the common solvents. In order to facilitate purification, this material was converted into the more soluble di-methylester derivative by treatment with excess methanol and dry hydrogen chloride. Concentration of the methanol solution gave colorless prisms, which after crystallization from methanol melted at 218° C. uncorrected. The analysis and infrared spectrum of this material are compatible with the compound dimethyl 4,4'-(1,1,2,2-tetramethylethylene)dibenzoate. Calculated for $C_{22}H_{26}O_4$: C, 74.55; H, 7.40; saponification number 177. Found: C, 74.47; H, 7.59; saponification number 172. The hydrolysis of the dimethyl ester is accomplished by refluxing the same in methanolic potassium hydroxide followed by acidification with hydrochloric acid to give a solid having a melting point greater than 300° C. Analysis and infrared spectroscopy demonstrated this material to be the di-acid derivative of the above-identified dimethyl ester and was found to be 4,4'-(1,1,2,2-tetramethylethylene)dibenzoic acid.

PREPARATION OF 4,4'-(1,1,2,2-TETRAETHYLETHYLENE)DIBENZOIC ACID

The first example is repeated in substantially all details except that the ditolyl alkane used as a starting material is 1,1,2,2-tetraethyl-1,2-di(p-tolyl)ethane and the dicarboxylic acid produced is 4,4'-(1,1,2,2-tetraethylethylene)-dibenzoic acid.

PREPARATION OF 4,4'-(1,2-DIETHYL-1,2-DIMETHYLETHYLENE)-DIBENZOIC ACID

The first example is repeated in substantially all essential details except that the ditolyl alkane which is oxidized is 1,2-diethyl-1,2-dimethyl-1,2,-di(p-tolyl)ethane. The acid produced is 4,4'-(1,2-diethyl-1,2-dimethylethylene)-dibenzoic acid.

PREPARATION OF 4,4'-ISOPROPYLIDENEDIBENZOIC ACID

The first example is repeated in all essential details except that the ditolyl alkane which is oxidized is 2,2-di(p-tolyl)propane and the corresponding acid is produced, namely, 4,4'-isopropylidenedibenzoic acid.

Among the dicarboxylic acids which may be prepared in accordance with the concepts of the present invention are: 4,4'-isopropylidenedibenzoic acid; 4,4'-(2,2-butylidene)dibenzoic acid; 4,4'-(1,1,2,2-tetramethylethylene)-dibenzoic acid; 4,4'-(1,1,2,2-tetraethylethylene)dibenzoic acid; 4,4'-(1,1,2,2-tetrapropylethylene)dibenzoic acid; 4,4'-(1,1,2,2-tetrabutylethylene)dibenzoic acid; 3,3'-isopropylidenedibenzoic acid; 2,2'-isopropylidenedibenzoic acid; 4,4'-(1,2-diethyl-1,2-dimethylethylene)dibenzoic acid; 2,2'-(1,1,2,2-tetraethylethylene)dibenzoic acid; 2,2'-(1,1,2,2-tetrabutylethylene)dibenzoic acid; 4,4'-(2,2-butylidene)dibenzoic acid; 3,3'-(2,2-butylidene)dibenzoic acid; 2,2'-(2,2-butylidene)dibenzoic acid; 4,4'-(2,2-pentylidene)dibenzoic acid; 3,3'-(2,2-pentylidene)dibenzoic acid; 2,2'-(2,2-pentylidene)dibenzoic acid; 3,3'-(3,3-pentylidene)dibenzoic acid; 2,2'-(3,3-pentylidene)dibenzoic acid; 4,4'-(2,2-hexylidene)dibenzoic acid; 3,3'-(2,2-hexylidene)dibenzoic acid; 2,2'-(2,2-hexylidene)dibenzoic acid; 4,4'-(3,3-hexylidene)dibenzoic acid; 4,4'-(3,3-heptylidene)dibenzoic acid; 3,3'-(3,3-heptylidene)dibenzoic acid; 4,4'-(4,4-heptylidene)dibenzoic acid; 4,4'-(4,4-octylidene)dibenzoic acid; 3,3'-(4,4-octylidene)dibenzoic acid; 2,2'-(4,4-octylidene)dibenzoic acid; 4,4'-(5,5-nonylidene)dibenzoic acid; 3,3'-(5,5-nonylidene)dibenzoic acid; 2,2'-(5,5-nonylidene)dibenzoic acid.

In the preparation of the alkyd resins of the present invention, one may react a dibenzoic acid such as those set forth hereinabove with any of the conventional polyhydric alcohols used in the preparation of alkyd resins. Illustrative of these polyhydric alcohols are ethylene glycol, diethylene glycol, trimethylene glycol, tetramethylene glycol, glycerol, trimethylolpropane, trimethylolethane, sorbitol, pentaerythritol, dipentaerythritol, pinecol, arabitol, xylitol, adonitol, mennitol, or the alkane diols and the like. Quite obviously, these polyhydric alcohols may be used either singly or in combination with one another.

In the preparation of alkyd resins, it is often desirable to make use of a glyceride oil in order to impart flexibility to the alkyd resins produced. Any of the glyceride oils or fatty acids derived therefrom or their monoglycerides may be used. These oils may be either non-drying, semi-drying or drying oils. In the preparation of such an oil-modified alkyd resin, the dicarboxylic acids used in the present invention may be reacted with a polyhydric alcohol alcoholysis product of these saturated and/or unsaturated glyceride oils. Illustrative of these oils are coconut oil, palm oil, safflower oil, rape seed oil, peanut oil, corn oil, cottonseed oil, soya oil, linseed oil, perilla oil, castor oil, either raw or dehydrated, talloil, oiticica oil, sardine oil, tung oil, whale oil and the like. Additionally, one may make use of certain fatty acids such as lauric acid, stearic acid, palmitic acid and the like. Quite obviously, these oils and/or their fatty acids and/or their monoglycerides may be used either singly or in combination with one another.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

Into a suitable reaction vessel, equipped with thermometer, stirrer and inlet and outlet tubes for the passage of inert gases therethrough, there is introduced 298 parts of 4,4'-(2,2-butylidene) dibenzoic acid, 240 parts of soya fatty acids and 118 parts of glycerin. The charge is heated to about 245° C. and held at that temperature until esterification is substantially complete. This resin has an acid number of 10.9 and a Gardner-Holdt viscosity of Z–2 at 50% solids in xylol at 25° C. and a color of 5 (Gardner–1933).

Example 2

Into a suitable reaction vessel equipped as in Example 1, there is introduced 284 parts of 4,4'-isopropylidenedibenzoic acid, 240 parts of linseed oil fatty acids, 100 parts of glycerin and 18 parts of ethylene glycol. The reaction chamber is flushed with nitrogen gas so as to provide an inert gas blanket over the reacting materials during the reaction. The charge is then heated to about 240–250° C. and held at about that temperature until esterification is substantially complete as indicated by an acid number of 15.

Example 3

Into a suitable reaction vessel equipped as in Example 1, there is introduced 312 parts of 4,4'-(3,3-pentylidene)-dibenzoic acid, 360 parts of the fatty acid fraction of talloil, 119 parts of pentaerythritol, and 95 parts of propylene glycol. The reaction vessel is flushed with nitrogen as in Example 2 and the charge is then heated to about 250° C. and held at that temperature until esterification is substantially complete as is shown by an acid number of 8.

Example 4

Into a suitable reaction vessel equipped as in Example 1, there is introduced 708 parts of dimethyl 4,4'-(1,1,2,2-tetramethylethylene)dibenzoate, 294 parts of the methyl esters of dehydrated castor oil fatty acids, 187 parts of pentaerythritol and 4.5 parts of lead octoate. The charge is heated under a blanket of nitrogen gas to 190–200° C. whereupon methanol is continuously removed. The reaction is stopped short of gelation. The resin is diluted with cellosolve acetate to a solids content of about 50%.

Example 5

A clear unpigmented solution of the alkyd resin of Example 1 is used to draw down films on steel panels and the film is baked for 30 minutes at 300° F. A clear unpigmented solution of a 36% soya fatty acid modified phthalic alkyd is used to drawn down films as above. These solutions contained .015% by weight of cobalt as cobalt naphthenate. The comparative results are shown in Table 1.

TABLE 1

|  | Phthalic Alkyd Resin | Alkyd Resin of Example 1 |
| --- | --- | --- |
| Knife scratch | Fair | Excellent. |
| Solvent Resistance Xylol | Poor | Good. |
| 5% NaOH | do | Excellent. |
| 50% Acetic Acid | do | Do. |
| Impact Resistance (inch lbs.) | <2 | 28. |

Comparable films are drawn down on separate glass panels from the alkyd resin prepared according to Example 1 and from a comparable alkyd prepared from phthalic anhydride. Each of these alkyd resins contained 0.015% by weight of cobalt as cobalt naphthenate. The films were allowed to air-dry on these glass panels. The results are shown in the following table.

TABLE 2

|  | Alkyd Resin of Example 1 | Phthalic Alkyd Resin |
| --- | --- | --- |
| Drying Rate 3 hrs | Tack free | Tacky. |
| Drying Rate 24 hrs | Dry | Green. |
| Hardness (24 hrs.) | Excellent | Poor. |
| Through dry (24 hrs.) | do | Fair. |

In addition to the dicarboxylic acids used in the manufacture of the alkyd resins of the present invention, one may make use of other dicarboxylic acids which are free of non-benzenoid unsaturation such as phthalic, oxalic, succinic, glutaric, sebacic, adipic, pimelic, suberic, azelaic, tricarballylic, citric, tartaric, malic and the like. Obviously, these polycarboxylic acids and/or their anhydrides (whenever available) may be used either singly or in combination with one another in conjunction with the bis-benzoic acids used in the present invention. In order to realize the full value of the bis-benzoic acids, it is desired that the total molar quantity of the bis-benzoic acid be at least about 50% of the total number of moles of dicarboxylic acid used in the preparation of the alkyd resin. If desired, minor amounts, not exceeding about 10% mole weight of alpha, beta ethylenically unsaturated dicarboxylic acids may be used such as maleic, fumaric, aconitic, itaconic and the like.

The oil content of the alkyd resins of the present invention may be varied over a fairly wide range so as to include the short oil modified alkyd resins, the medium oil modified alkyd resins and the long oil modified alkyd resins.

The amount of polyhydric alcohol such as glycerol which is used to react with the polycarboxylic acid and the oily material should be at least sufficient calculated on a stoichiometric basis to esterify substantially completely all of the carboxyl groups available, actually or potentially, in the polycarboxylic acid and the oily material. Preferably, one would use about a 10% excess of polyhydric alcohol over and beyond the stoichiometric requirements of the same and even larger excesses may be utilized, if desired.

The bis-benzoic acids used in the present invention may be further modified before use in order to produce substituted dicarboxylic acids for particular purposes. For instance, if halogenated acids are desired, such as those which are utilized in the preparation of fire resistant alkyd resins, a fundamental bis-benzoic acid used in the present invention may first be nuclearly halogenated with chlorine, bromine, iodine and/or fluorine.

The temperature at which the alkyd resin is prepared may be varied over a fairly wide range as is well known in the alkyd resin manufacture. In carrying out the esterification reaction in the production of the alkyd resins of the present invention, one may heat react the bis-benzoic acids, a polyhydric alcohol and an oily material of the class described at a temperature between about 180° C. and 310° C. Preferably, one would react the recited ingredients at a temperature between about 220° C. and 260° C.

This application is a continuation-in-part of my earlier filed application having the Serial No. 523,355, filed July 20, 1955, entitled "Novel Products and Process for Preparing the Same."

What I claim is:

1. An oil modified alkyd resin comprising the heat reaction product of (1) a material selected from the group consisting of drying and semi-drying glyceride oils and glyceride oil fatty acids, (2) a polyhydric alcohol having at least 3 hydroxyl groups and (3) an acid having the general formula:

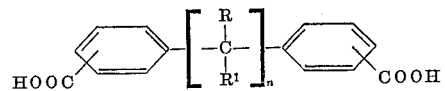

wherein R and R$^1$ are alkyl groups containing 1 to 4 carbon atoms and $n$ is a whole number between 1 and 2, inclusive.

2. An oil modified alkyd resin comprising the heat reaction product of (1) a material selected from the group consisting of drying and semi-drying glyceride oils and glyceride oil fatty acids, (2) a polyhydric alcohol having at least 3 hydroxyl groups and (3) 4,4'-isopropylidenedibenzoic acid.

3. An oil modified alkyd resin comprising the heat reaction product of (1) a material selected from the group consisting of drying and semi-drying glyceride oils and glyceride oil fatty acids, (2) a polyhydric alcohol having at least 3 hydroxyl groups and (3) 4,4'-(1,1,2,2-tetramethylethylene) dibenzoic acid.

4. An oil modified alkyd resin comprising the heat reaction product of (1) a material selected from the group consisting of drying and semi-drying glyceride oils and glyceride oil fatty acids, (2) a polyhydric alcohol having at least 3 hydroxyl groups and (3) 4,4'-(3,3-pentylidene) dibenzoic acid.

5. An oil modified alkyd resin comprising the heat reaction product of (1) a material selected from the group consisting of drying and semi-drying glyceride oils and glyceride oil fatty acids, (2) a polyhydric alcohol having at least 3 hydroxyl groups and (3) 4,4'-(1,1,2,2-tetraethylethylene) dibenzoic acid.

6. An oil modified alkyd resin comprising the heat reaction product of (1) a material selected from the group consisting of drying and semi-drying glyceride oils and glyceride oil fatty acids, (2) a polyhydric alcohol having at least 3 hydroxyl groups and (3) 4,4'-(2,2-butylidene) dibenzoic acid.

7. An oil modified alkyd resin comprising the heat reaction product of (1) a material selected from the group consisting of drying and semi-drying glyceride oils and glyceride oil fatty acids, (2) glycerol and (3) an acid having the general formula:

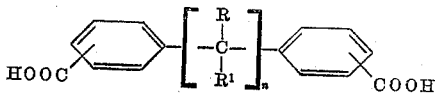

wherein R and R¹ are alkyl groups containing 1 to 4 carbon atoms and $n$ is a whole number between 1 and 2, inclusive.

8. An oil modified alkyd resin comprising the heat reaction product of (1) a material selected from the group consisting of drying and semi-drying glyceride oils and glyceride oil fatty acids, (2) glycerol and (3) 4,4'-isopropylidene-dibenzoic acid.

9. An oil modified alkyd resin comprising the heat reaction product of (1) a material selected from the group consisting of drying and semi-drying glyceride oils and glyceride oil fatty acids, (2) glycerol and (3) 4,4'-(3,3-pentylidene) dibenzoic acid.

10. An oil modified alkyd resin comprising the heat reaction product of (1) a material selected from the group consisting of drying and semi-drying glyceride oils and glyceride oil fatty acids, (2) glycerol and (3) 4,4'-(2,2-butylidene) dibenzoic acid.

11. A process for the preparation of an oil modified alkyd resin comprising heat reacting, at a temperature between about 180° C. and 310° C., (1) a material selected from the group consisting of drying and semi-drying glyceride oils and drying and semi-drying glyceride oil fatty acids, (2) a polyhydric alcohol having at least 3 hydroxyl groups and (3) an acid having the general formula:

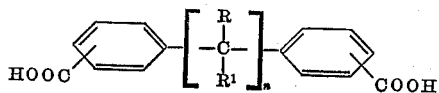

wherein R and R¹ are alkyl groups containing 1 to 4 carbon atoms and $n$ is a whole number between 1 and 2, inclusive.

12. A process for the preparation of an oil modified alkyd resin comprising heat reacting, at a temperature between about 180° C. and 310° C., (1) a material selected from the group consisting of drying and semi-drying glyceride oils and drying and semi-drying glyceride oil fatty acids, (2) a polyhydric alcohol having at least 3 hydroxyl groups and (3) 4,4'-isopropylidenedibenzoic acid.

13. A process for the preparation of an oil modified alkyd resin comprising heat reacting, at a temperature between about 180° C. and 310° C., (1) a material selected from the group consisting of drying and semi-drying glyceride oils and drying and semi-drying glyceride oil fatty acids, (2) a polyhydric alcohol having at least 3 hydroxyl groups and (3) 4,4'-(1,1,2,2-tetramethylethylene)dibenzoic acid.

14. A process for the preparation of an oil modified alkyd resin comprising heat reacting, at a temperature between about 180° C. and 310° C., (1) a material selected from the group consisting of drying and semi-drying glyceride oils and drying and semi-drying glyceride oil fatty acids, (2) a polyhydric alcohol having at least 3 hydroxyl groups and (3) 4,4'-(3,3-pentylidene)dibenzoic acid.

15. A process for the preparation of an oil modified alkyd resin comprising heat reacting, at a temperature between about 180° C. and 310° C., (1) a material selected from the group consisting of drying and semi-drying glyceride oils and drying and semi-drying glyceride oil fatty acids, (2) a polyhydric alcohol having at least 3 hydroxyl groups and (3) 4,4'-(1,1,2,2-tetraethylethylene)-dibenzoic acid.

16. A process for the preparation of an oil modified alkyd resin comprising heat reacting, at a temperature between about 180° C. and 310° C., (1) a material selected from the group consisting of drying and semi-drying glyceride oils and drying and semi-drying glyceride oil fatty acids, (2) a polyhydric alcohol having at least 3 hydroxyl groups and (3) 4,4'-(2,2-butylidene)dibenzoic acid.

17. A process for the preparation of an oil modified alkyd resin comprising heat reacting, at a temperature between about 180° C. and 310° C., (1) a material selected from the group consisting of drying and semi-drying glyceride oils and drying and semi-drying glyceride oil fatty acids, (2) glycerol and (3) an acid having the general formula:

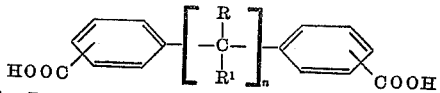

wherein R and R¹ are alkyl groups containing 1 to 4 carbon atoms and $n$ is a whole number between 1 and 2, inclusive.

18. A process for the preparation of an oil modified alkyd resin comprising heat reacting, at a temperature between about 180° C. and 310° C., (1) a material selected from the group consisting of drying and semi-drying glyceride oils and drying and semi-drying glyceride oil fatty acids, (2) glycerol and (3) 4,4'-isopropylidene-dibenzoic acid.

19. A process for the preparation of an oil modified alkyd resin comprising heat reacting, at a temperature between about 180° C. and 310° C., (1) a material selected from the group consisting of drying and semi-drying glyceride oils and drying and semi-drying glyceride oil fatty acids, (2) glycerol and (3) 4,4'-(2,2-butylidene)dibenzoic acid.

References Cited in the file of this patent

UNITED STATES PATENTS

| | | |
|---|---|---|
| 2,720,503 | Wellman | Oct. 11, 1955 |
| 2,720,506 | Caldwell | Oct. 11, 1955 |
| 2,794,822 | Schweitzer | June 4, 1957 |

UNITED STATES PATENT OFFICE
CERTIFICATE OF CORRECTION

Patent No. 2,851,432                                                  September 9, 1958

John C. Petropoulos

It is hereby certified that error appears in the printed specification of the above numbered patent requiring correction and that the said Letters Patent should read as corrected below.

Column 4, line 44, for "2,3-di-(p-tolyl)-pentane" read -- 3,3-di-p-tolyl-pentane --; column 5, line 16, for "$C_{20}H_{24}O_{20}$" read -- $C_{20}H_{24}O_2$ --; column 6, line 20, for "pinecol" read -- pinacol --; line 21, for "mennitol" read -- mannitol --.

Signed and sealed this 25th day of November 1958.

(SEAL)
Attest:

KARL H. AXLINE                                                 ROBERT C. WATSON
Attesting Officer                                         Commissioner of Patents